United States Patent Office 3,424,097
Patented Jan. 28, 1969

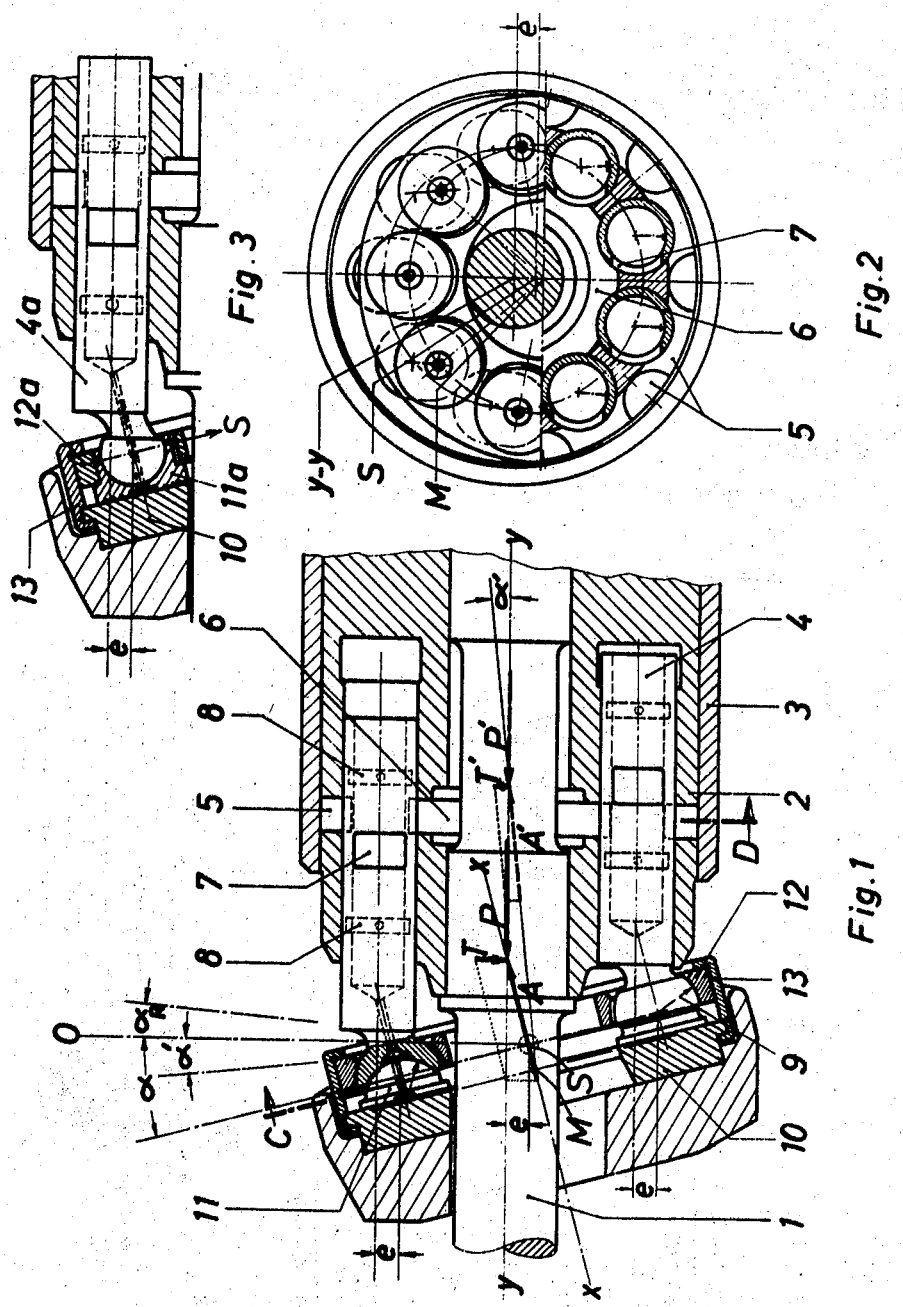

3,424,097
HYDROSTATIC AXIAL PISTON UNIT OF THE SLIPPING SHOE DESIGN
Hans Molly, Dr.-Eugen-Essig-Strasse 48, Malsch, Kreis Karlsruhe, Germany
Filed Aug. 1, 1966, Ser. No. 569,256
Claims priority, application Germany, Aug. 7, 1965, M 66,261
U.S. Cl. 103—162
Int. Cl. F04b 1/20
5 Claims

ABSTRACT OF THE DISCLOSURE

In a hydraulic pump or motor having piston members in a cylinder block which are operated by a swash plate member inclined towards one side of the cylinder block. The operative connection between the piston members and the inclined swash plate member is formed by a semi-spherical head on one member and a mating semi-spherical socket on the other member, the head and socket are formed about a center which is offset from the axis of the respective piston in the direction of a line between the unit axis and said side of the cylinder block.

---

The invention relates to an axial piston unit in which the torque is being developed at the cylinder block, having a swash plate, against which the pistons which are guided within the cylinder block are being supported through swivel-mounted slipping shoes, which are retained by a common guiding element.

Conventional axial piston units of this type have the slipping shoes swivel-mounted to a point on the piston axis. This is why difficulties arise since tilting forces are acting onto the pistons. These tilting forces have their point of action outside the piston guide and therefore are not absorbed by the piston guide but cause cocking of the piston in its cylinder. These conditions will be described hereunder by means of FIG. 4 showing the design complying with the present stage of technology:

There is a cylinder block 15 in which pistons 16 are guided. Each of pistons 16 have a slipping shoe 17 at its end. The ball pivot 18 at the end of the piston is pivotal around point 19 on the Z—Z piston axis. Slipping shoes 17 slip on swash plate 20 which is for this purpose equipped with a sliding surface. Swash plate 20 is inclined with respect to piston axis Z—Z and with respect to the axis of cylinderblock 15. When the swash plate and the cylinder block rotate with respect to each other, pistons 16 perform a stroke movement while slipping shoes 17 are sliding on surface 21.

Watching the forces, there is a supporting force A of the swash plate, the line of action of which is running vertically to the sliding surface through pivot 19. As a matter of fact, a force cannot be transmitted in the level of the sliding surface. Counteracting is force P originating from the pressure fluid within the cylinder and acting onto piston 16. Line of action of force P coincides with piston axis Z—Z and also runs through point 19. At this intersection of lines of action, there is a resultant T of the forces, thus creating the torque moment. This shows that in slipping shoes designs of the present stage of technology, the force which is creating the torque moment develops within the slipping shoe support, that is out of the piston guide. Force T is not being absorbed directly by the piston guide, but is tending with its relatively long lever arm to cause cocking of the pistons.

The idea of the invention is to design an axial piston unit with a suitable slipping shoe arrangement to most effectively avoid cocking forces.

The invention comprises mounting the slipping shoes excentrically to the piston axes and holding them by the guiding element in positions offset from the piston axes in the direction to the side of the swash plate which is inclined towards the cylinder block. Here too, the line of action of the supporting force is directed vertically to the sliding surface and goes through the pivot point of the slipping shoe support. Since the slipping shoe, however, is not arranged centrically to the piston axis, the intersection of the lines of action of the supporting force and of the pressure fluid force onto the piston is no more located in this pivot point, but is moved towards the piston guide. By this means, it is possible to create the resulting force and thus the torque moment within the piston guidance (or at least immediately besides it), so that cocking moments are being avoided and the force which is generating the torque is being immediately absorbed by the piston guides.

Description of the drawings:
FIG. 1 showing a longitudinal cross section of such hydrostatic unit.
FIG. 2 showing a cross section through the control and a view of the slipping shoes.
FIG. 3 showing a modified design with conventional slipping shoes.

Figure 4:
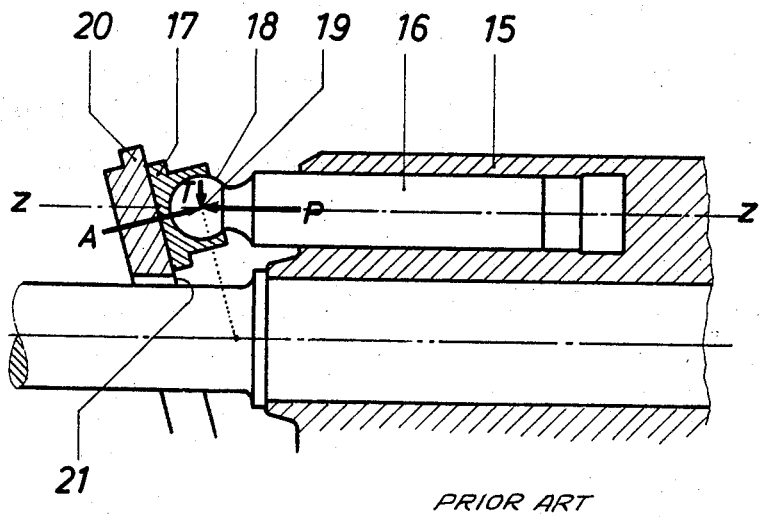
FIG. 4 illustrates the prior art problem.

Item 1 is the drive shaft of a cylinder block 2, which is surrounded by a sleeve 3. A number of pistons 4 and 4a are mounted within the cylinder block with their axes parallel. The cylinder block has recesses 5 and 6 in the area of the piston tracks, which recesses forming valving edges with the cylinder bores. The pistons have valving slots 7, which lead into the interior of the hollow piston, and have relief areas 8 at their outside, which also are in contact with the interior of the piston. The end of the piston protruding from the cylinder has a semi-spherical area 9, the center of which has a distance e from the piston axis. It is the same distance e in which slipping shoe 11 and a retainer disc 12, 12a are moving which is grasping the pistons 4, 4a by means of a spherical area, also. The ball-type grip of retainer disc 12 to the pistons gives sufficient play to permit the elliptic tracks which the pistons act in relation to the swashplate.

Retainer disc 12, 12a is secured by means of ring 13 which is pressed around sliding disc 10, thus ensuring the distance between retainer disc and sliding disc. The sliding disc 10 holds the complete rotating system which moves about the center M. In operating condition, the filling pressure and the operating pressure of the unit constantly keep up the contact between pistons and sliding disc, while in special cases, with no oil pressure, but with rotating parts, the retainer mechanism prevents the system from coming apart.

Due to the orientation (angular rotating position) of the retainer disc on the shaft X—X of the swash plate, the pistons cannot deviate by rotating from their position shown in FIG. 2. Also with other angles of the swash plate within the range from zero to max., the orientation of the position of the pistons which is decisive for the reversing process, does not change. At all angular positions they equally well assure the reversing process of the oil flow.

In FIG. 1, the vector P is the total of the forces emanating from the pistons of the unit and acting at the semi-circle point of gravity of the pistons under oil pressure. Vector P in FIG. 1 therefore is a projection onto the paper level. In reality it is located in front of the paper level. Counteracting this force P is, on the same level, the supporting force A coming from the sliding area. At the intersection of the lines of action of these forces, a tangential force T appears. This is the torque-creating force. Due to the distance $e$ of slipping shoes 11 from the pistons and the guidance of the pistons within ring 12, it has been achieved to localize this force T mostly within the piston sliding track of the pistons so that the forces in this design transmit their resultant without a tilting effect from the pistons onto the cylinder block, which then develops the torque.

FIG. 1 shows the conditions at the maximum inclination of angle $\alpha$. At less inclination, the conditions are described by vectors P', A' and T' for the angles $\alpha'$.

The design under this invention permits inclining the swash plate about pivot point S up to the vertical position shown in FIG. 1.

A conventional design in which the reversing is also effected by the pistons themselves and which provides slipping shoes which are swivel-mounted to the pistons through a cylindrical support face (therefore swivelling around one axis only) the swash plate cannot be inclined as far toward the position at which it is vertical to the axis of rotation, because the slipping shoes and pistons in this position would completely loose their orientation. This danger does not exist in the layout of this invention.

The invention is claimed as follows:

1. In a hydraulic axial piston unit formed about an axis and having a plurality of pistons mounted in a cylinder block for linear movement along axes parallel to the axis of the unit, said cylinders being operatively connected to swash plate means angularly disposed with respect to said unit axis so that one side of the swash plate means is closer to the cylinder block than is the remainder of the swash plate means, said connection being formed by a pressure member on the piston and having a semi-spherical surface in contact with a mating semi-spherical surface on a pressure member on the swash plate means, the improvement comprising: said semi-spherical surfaces associated with each piston being positioned about a center which is offset from the axis of the respective piston in the direction of a line between the unit axis and said one side of the swash plate means, the direction of the offset being such that said center is spaced from the piston axis generally toward said one side to thereby reduce the tendency of the piston to cock in the cylinder.

2. In a hydraulic axial piston unit as set forth in claim 1, wherein said surfaces of said piston pressure members are concave and said mating surfaces are convex.

3. In a hydraulic axial piston unit as set forth in claim 2, wherein each piston pressure member is in the form of a shell-shaped head connected to the piston by a neck inclined in said direction from the piston to the head, said head having an outer surface which is a segment of a sphere, said swash plate means including a guiding ring having openings therein within which said heads are received, the portions of the ring defining said openings fitting about said outer surfaces to prevent movement of the heads away from the swash plate means.

4. In a hydraulic axial piston unit as set forth in claim 3, wherein said outer surface is formed about a center which is offset from the axis of the respective piston a distance corresponding to the maximum offset of the center of the swash plate means from the unit axis.

5. In a hydraulic axial piston unit as set forth in claim 4, wherein the angular disposition of the swash plate means with respect to the unit axis may be varied between said maximum and a position at which said center of the swash plate means is on said unit axis.

References Cited

UNITED STATES PATENTS

| | | | |
|---|---|---|---|
| 1,744,791 | 1/1930 | Nemetz | 103—157 |
| 1,779,032 | 10/1930 | Cathcart | 123—43 |
| 2,428,809 | 10/1947 | Parilla et al. | 103—157 |
| 2,633,802 | 4/1953 | Parilla et al. | 103—157 |
| 2,721,519 | 10/1955 | Henrichsen | 103—162 |
| 2,769,393 | 11/1956 | Cardillo et al. | 103—162 |
| 3,304,884 | 2/1967 | Koons | 103—162 |

WILLIAM L. FREEH, *Primary Examiner.*